Aug. 22, 1933.  J. C. ASCH  1,923,807
ILLUMINATING DEVICE AND METHOD OF MANUFACTURING SAME
Filed Dec. 10, 1932
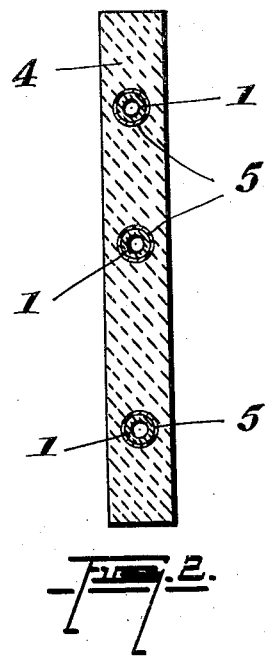
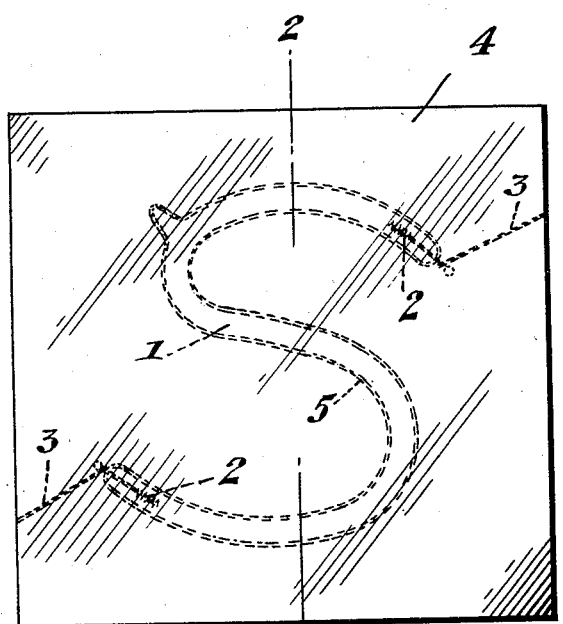
Inventor
Joseph C. Asch
BY Eugene E. Stevens
Atty.

Patented Aug. 22, 1933

1,923,807

UNITED STATES PATENT OFFICE 1,923,807

ILLUMINATING DEVICE AND METHOD OF MANUFACTURING SAME

Joseph Charles Asch, Montreal, Quebec, Canada

Application December 10, 1932
Serial No. 646,738

4 Claims. (Cl. 40—130)

This invention relates to improvements in illuminating devices and method of manufacturing the same. The objects of the invention are to provide a convenient method of protecting frangible elements such as luminous gas discharge tubes and to avoid any tendency of the protecting material to crack or injure the tubes.

Luminescent gas discharge tubes, commonly known as neon tubes, consisting of a gas envelope and electrodes between which a discharge is passed through the gas in the tube, may be protected from injury by imbedding them in a translucent setting material, such as phenol formaldehyde resin, which, after the tube is imbedded in it, is set or cured by baking for the required period of time. It is found, however, that except when the luminous tubes are of a very simple form, they tend to be cracked or broken by reason of the contraction of the resinous material on cooling. This difficulty is overcome according to the present invention by interposing a thermoplastic material between the tube and the setting material as hereinafter more fully set forth and described.

A simple form of illuminating device to which the invention may be applied is shown in the accompanying drawing, in which Figure 1 is a plan view and Figure 2 a section on the line 2—2 of Figure 1. Referring to the drawing, 1 indicates a tube containing an electrically sensitive gas shown in the form of the letter S with electrodes at its extremity and electrical connections 3 leading from the electrode to the edge of the block 4, in which the tube is imbedded. This block is formed from any convenient translucent setting material, such as phenol formaldehyde resin. The tube 1, during its process of manufacture as hereinafter described, is coated or formed with a layer of thermo-plastic material 5. This material should be translucent and of a similar character to that constituting the main body of the fixture, but having the characteristic that at ordinary temperatures, even as low as 30° Fahrenheit below zero, it is in a semi-plastic instead of a rigidly solid condition.

A particular thermo-plastic material which I have found satisfactory for this purpose is a polymerized vinyl acetate made plastic with a plasticizer such as dibutyl phthalate. One advantage of this material is that by varying the proportion of the plasticizer it is possible to obtain within wide limits any desired degree of plasticity at common low temperatures. Thus, for example, for very cold climates a higher percentage (20–25%) of dibutyl phthalate is used, while for warmer climates about 10% is sufficient. The material becomes sufficiently liquid to permit luminescent gas tubes of glass to be surrounded with it by dipping or otherwise when it is at a temperature which is not too high to cause any injury to the tubes or connections, but since it does not become fully liquid until it has been raised to a temperature of about 150° centigrade, a phenol formaldehyde resin may be poured around it and molded upon it at a temperature below the boiling point of water, without substantially affecting its semi-plastic consistency. This phenol formaldehyde resin constitutes the block 4 and may be set or cured by baking in ovens for a period.

Although the formation of the phenol formaldehyde resin does not form part of the present invention, a convenient way of preparing it may be described, which is to take a mixture of phenol and ordinary aqueous formaldehyde (about 37%) and a catalyst, usually a small amount of ammonia for an alkaline catalyst or a small amount of sulphuric acid for an acid catalyst. The mixture is heated in a digester and the reaction carefully controlled. The water and other vapors are distilled off usually in a vacuum and the process is carried on until resinification has occurred. While the mixture is still in liquid form it may either be poured into molds in which the illuminating tubes with their electrical connections have been previously suspended, or a mold may be partly filled with it, the tube, according to the present invention, being previously coated with thermoplastic material. The process of curing is carried on sufficiently to cause it to acquire a consistency sufficient to support the tubes and electrical connections, and these are then laid upon the material and covered with additional liquid, after which the process of curing is proceeded with until completion. The finished article consists of a solid transparent or translucent block with the lighting tubes completely and solidly imbedded in its interior, the necessary electrical connections being led from them to an outside edge of the block.

The process of curing consists in the baking of the material in ovens for a period of six to eight days at a temperature commencing at about 180° F. and maintained throughout at the said or slightly higher temperatures not exceeding 210° F. When it is desired to cure a layer of the material sufficiently to support tubes and their connections, the process of curing is carried on for some three or four days before the tubes and connections are laid upon it and continued for an additional six or eight days after this has been done and the further layer of the liquid material poured on, thus making the total time required for the curing of a given fixture about nine to eleven days.

Various modifications may be made in the invention without departing from the spirit thereof or the scope of the claims and, therefore, the exact forms shown are to be taken as illustrative only and not in a limiting sense, and I desire that only such limitations shall be placed thereon as are imposed by the prior art or are specifically set forth in the appended claims.

What I claim as my invention is:

1. As a new article of manufacture, an illuminating device comprising a frangible transparent container, a transparent setting material surrounding the container and a thermo-plastic material between the setting material and the container.

2. A lighting device comprising a block of translucent synthetic resin compound, a luminous gas discharge device imbedded therein, and a thermo-plastic material between the gas discharge device and the synthetic resin compound.

3. An illuminating device comprising a block of translucent synthetic resin compound, a luminous gas discharge device imbedded therein and a coating comprising a polymerized vinyl acetate with a plasticizer surrounding the device.

4. A lighting fixture consisting of a transparent or translucent block having imbedded therein luminescent gas tubes made of glass and electrical connections therefor in such manner that the light may be visible from both sides of the block, this being composed of two materials, an inside layer adjacent to the tubes consisting of a material which, at temperatures not far above the boiling point of water, is sufficiently fluid to permit of its being molded upon them and having, at ordinary outside temperatures, a semi-plastic consistency, and an outside layer consisting of a material which, before curing, is liquid at temperatures below the boiling point of water but which, upon curing, becomes and remains solid at such temperatures.

JOSEPH C. ASCH.